United States Patent
Vleer et al.

(10) Patent No.: US 6,628,769 B1
(45) Date of Patent: Sep. 30, 2003

(54) INTELLIGENT NETWORK

(75) Inventors: Laurentius Josephus Maria Vleer, Boorschoten (NL); Joost Adriaanse, Moordrecht (NL); Paul Rietkerk, Leiden (NL); Harry Van Barneveld, Delft (NL)

(73) Assignee: Koninklijke KPN N.V., Groningen (NL)

( * ) Notice: Subject to any disclaimer, the term of this patent is extended or adjusted under 35 U.S.C. 154(b) by 0 days.

(21) Appl. No.: 09/582,904

(22) PCT Filed: Jan. 5, 1999

(86) PCT No.: PCT/EP99/00152
§ 371 (c)(1),
(2), (4) Date: Aug. 1, 2000

(87) PCT Pub. No.: WO99/35859
PCT Pub. Date: Jul. 15, 1999

(30) Foreign Application Priority Data
Jan. 7, 1998 (NL) .............................................. 1007969

(51) Int. Cl.[7] .................................................. H04M 3/42
(52) U.S. Cl. .......................... 379/207.01; 379/207.02; 379/207.04; 379/219; 379/221.01; 379/221.11
(58) Field of Search ....................... 379/207.04, 207.02, 379/219, 220.01, 221.01, 221.08, 221.09, 221.1, 221.11, 221.12, 229, 230

(56) References Cited

U.S. PATENT DOCUMENTS 6,226,289 B1 * 5/2001 Williams et al. ............ 370/385

* cited by examiner

*Primary Examiner*—William J. Deane, Jr.
(74) *Attorney, Agent, or Firm*—Michaelson & Wallace; Peter L. Michaelson; Janet M. Skafar

(57) ABSTRACT

Intelligent network (IN), comprising at least one Service Switching Point, SSP (2), at least one Service Control Point, SCP (3), one or more Intelligent Peripherals, IPs (5), and/or one or more Voice Response Systems, VRSs (4), which IN is capable of interacting with a PSTN or ISDN (1). The essence of the concept is an additional interface, in the form of a control member (6), between the IPs and/or VRs on one side and the Service Control Point(s) on the other side. Such makes it possible that the (advanced) IPs and VRSs are capable of exchanging all sorts of information with the SCP, without the IPs or VRSs consequently being occupied for an extended period of time. As a result, the SCP may dispose of (additional) information which in a regular IN cannot be made available to the SCP(s).

13 Claims, 1 Drawing Sheet

INTELLIGENT NETWORK

BACKGROUND OF THE INVENTION

Figure 1:
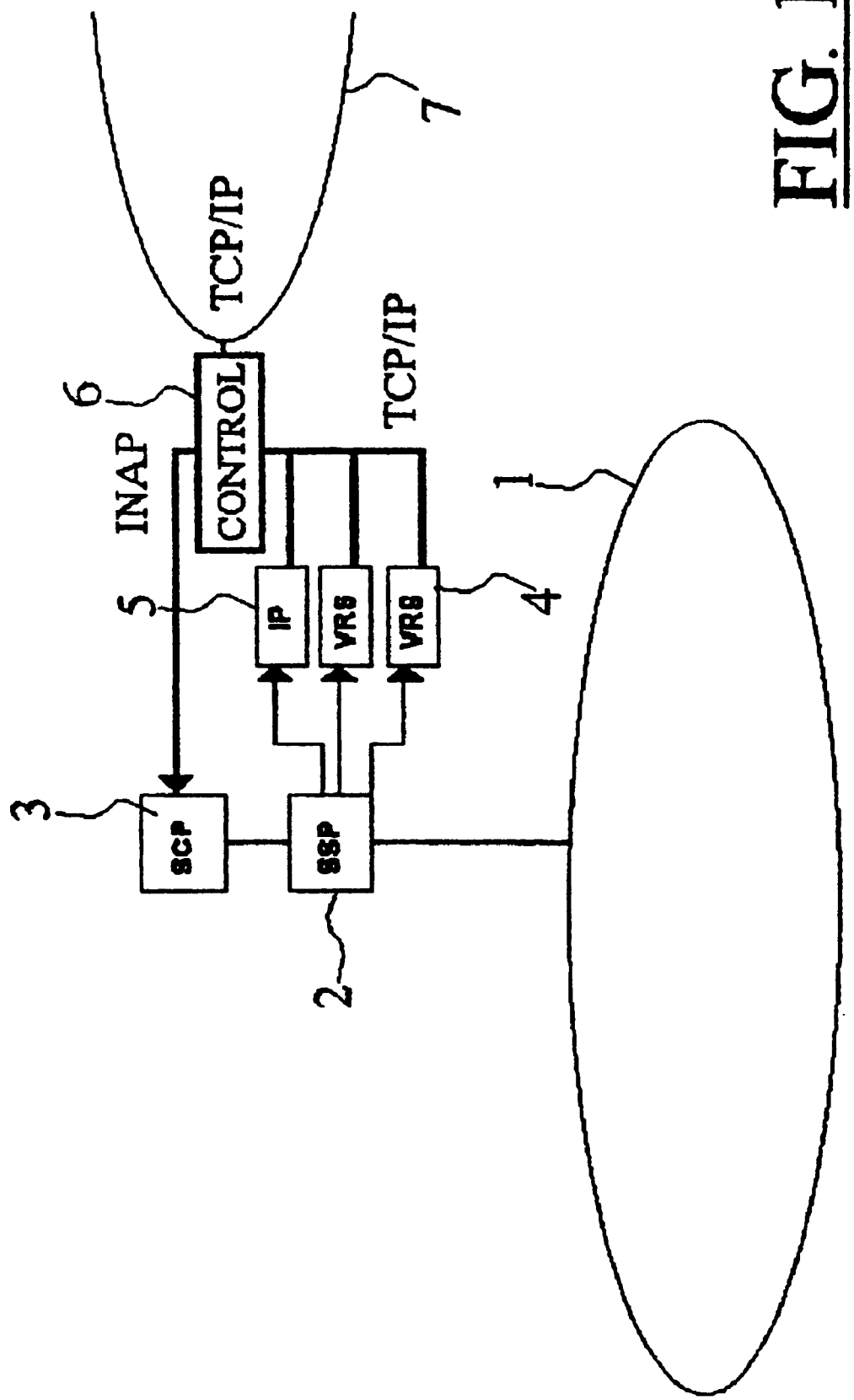

The invention relates to an intelligent network (IN), comprising at least one Service Switching Point, SSP, at least one Service Control Point, SCP, a number of network modules such as of the kind Intelligent Peripheral (IP), of the kind Voice Response System (VRS) which IN is capable of interacting with a telecommunications network of the kind PSTN [=Public Switched Telephone Network] or of the kind ISDN [=Integrated Services Digital Network].

In the current implementations of IN standards (AIN 0.1, AIN 0.2, CS1 and CS2), there is only provided for playing announcements by a VRS and for receiving DTMF tones [DTMF=dual tone multiple-frequency] by an IP. In the current, modern implementations of IP and VRS kind of network modules, however, there is offered much more functionality than playing a simple message and receiving DTMF tones. If it is desired to make use of said, more complex functionality, in most cases this will mean that an IP kind of network module also collects more complex information on a call from the PSTN. For many services, it is of importance to switch through, after receiving said information, to a subsequent destination, the destination being determined on the basis of the information collected. Since the IP cannot return information to the SCP, however, the IP itself will always maintain control over the call and will have to carry out interpretations, if any. The consequence is that any routing-through must always be switched by way of network modules such as IPs (or VRSs). In doing so, the available lines on the network modules are occupied for a longer period of time, which is a major impediment for the application of modern IP and VRS kind of network modules.

SUMMARY OF THE INVENTION

The object of the present invention is to see to it that, contrary to the aforementioned prior art, the IP or VRS kind of network module does return the information collected to the SCP; the network module may then return the call to the Service Switching Point (SSP), so that the line is vacated on the network module. On the basis of the information received, the SCP may instruct the SSP to switch the call through to another destination.

To attain said envisaged object, the network according to the invention provides for a control member which, on one side, is connected to an outputs of each of the number of network modules, for recording information signals given off by seach of the number of network modules, which stem from calls from the telecommunications network, offered to the network modules by way of the SSP, which control member buffers the signals recorded from the network modules, while on the other side the control member is connected to the SCP for giving off the information signals to the SCP on behalf of the network modules.

Using the control member proposed by the invention, several IP or VRS kind of network modules may be simply coupled together within one call, without special IP—IP interfaces or lines being required. In the event of application of the concept according to the invention, the network modules are occupied only for the minimum period of time required. Since in this concept the SSP always activates the modules, there is no interface required between modules mutually. Combinations of modules within a service may therefore be easily realized. Thus, e.g., a module for the validation of a new credit card may be easily integrated into existing services by including a module call in the service. If modules are already in use, any desired combination with said modules is possible, without the need of adjusting the interface for existing modules.

Since the SSP continuously sets up new outgoing calls when going through the various modules, it is possible to adopt a different rate for each module. In this case, fixing rates may take place by way of the regular SSP rate-fixing. If no use is made of the concept according to the invention, switching-through will have to be done by the IP kind of network module and, as to the SSP rate-fixing, only one rate will be permitted for the entire conversation.

By placing a central control member on the coupling between an IP or VRS kind of network module, there is realized a central interface point with which not only may there be driven SCPs but, e.g., also be written or retrieved information from external data bases. Said coupling is of particular importance for services where telephony services are combined with data services (also called Computer Telephony Integration, or CTI). An example thereof is the synchronization of data screens towards operators having client data and the incoming calls from clients towards said operators.

Furthermore, the concept is very flexible as various types of IPs (VRSs) may be chosen for each module. Combining modules is arranged from the SCP and switched by way of the SSP. As a result, all modules may be combined in random order. If modules (having new possibilities) are later added, they may be combined, in a service, with any existing modules.

Since the SSP continuously sets up new outgoing calls when going through the various modules, it is possible to adopt a different rate for each module. In this case, fixing rates may take place by way of the regular SSP rate-fixing. If no use is made of the concept according to the invention, switching-through will have to be done by the IP and, as to the SSP rate-fixing, only one rate will be permitted for the entire conversation.

By placing a central control member on the coupling between an IP or,VRS, there is realised a central interface point with which not only may there be driven SCPs but, e.g., also be written or retrieved information from external data bases. Said coupling is of particular importance for services where telephony services are combined with data services (also called Computer Telephony Integration, or CTI). An example thereof is the synchronisation of data screens towards operators having client data and the incoming calls from clients towards said operators.

Furthermore, the concept is very flexible as various IPs (VRSs) may be chosen for each module. Combining modules is arranged from the SCP and switched by way of the SSP. As a result, all modules may be combined in random order. If modules (having new possibilities) are later added, they may be combined, in a service, with any existing modules. Architecture proposed:

EXEMPLARY EMBODIMENTS

FIG. 1 shows the "Super-IP" architecture proposed by the invention. The figure shows a PSTN/ISDN 1 and, as part of an Intelligent-network architecture, an SSP 2, to which a number of VRSs and an IP 5 are connected. The SSP is additionally connected to an SCP. According to the invention, there is mounted a control member 6 which forms a buffer and a coupling between the IPs and VRSs and the SCP, as a result of which the SCP may be controlled by advanced control signals from modern IPs and VRSs without, however, using said (expensive) elements any longer than strictly necessary: the output of said elements is included and buffered by the control member 6 until the SCP is capable of using said buffered information. The coupling (designated by bold lines in the figure) may therefore be used for exchanging data collected for the call. There may also be given instructions, possibly by way of the coupling by the IP, VRS or control component, to the SCP for further processing the call. By having the coupling take place by way of a central control member, there originates a central coupling point which may also be used as a bridge to the IT world, such as external IT systems and/or data bases, represented by a network 7, such as the Internet. The protocol used between the IPs and VRSs and the control member is TCP/IP [TCP=transmission control protocol]; said protocol is also used for communication with the Internet 7. In the connection between the control member 6 and the SCP, the INAP protocol [?] is used.

The central control member 6 may also use the information from the IPs and VRSs for driving a Computer-Telephony-Integration (CTI) coupling towards desired final destinations (determined in, or by way of, the control member and passed on to the SCP). An example thereof is a transmission pop-up data screen having client information (on the basis of signalling information received, such as the telephone number of the caller) to the final destination (operator) who in synchronisation also receives the call from the client. Within this concept, the central control member operates as a synchronisation point for the telephony and data services. Since, in this concept, the SCP and SSP will take care of the eventual switching-through of a call, there automatically arises the option of network ACD [=Automatic Call Distributor] and CTI solutions.

The great advantages when applying the concept according to the invention are:

There is a briefer occupation of IP and VRS line capacity since the IP or VRS need not switch through but may also return the control and the call to the SCP and the SSP. IPs and VRSs are deployed in part of the call as a result of which, within one call, more IPs and/or VRSs may be easily addressed. In addition, IP/VRS applications may be simply and flexibly combined within one service.

The concept may be simply extended as ever more new IPs and/or VRSs may be used as modules. By applying the concept, the interface problems between IPs and/or VRSs are limited to a minimum.

Since for any module there are set up separate sub-conversations, there may be adopted a different rate for each module.

Synchronisation of telephony and data services is feasible using the central control member.

Since the SCP continues to control the switching-through of the call (and not the IP, VRS or PABX [=Private Automatic Branch eXchange]), upon application of this concept network ACD and CTI solutions may be realised in a simple manner.

What is claimed is:

1. Intelligent network comprising at least one Service Switching Point, SSP (2), at least one Service Control Point, SCP (3), a number of network modules and a control member, which intelligent network is capable of interacting with a telecommunications network, each of the number of network modules being of a kind out of two kinds, the two kinds of network modules being Intelligent Peripheral (IP) (5) and Voice Response System (4), and the telecommunications network being of a kind out of two kinds, the two kinds of telecommunication networks being public switched telephony network (PSTN) and integrated services digital network (ISDN) (1), wherein the control member (6), on one side, is connected to an output of each of the number of network modules (4, 5) for recording information signals given off by each of the number of network modules, which stem from calls from the telecommunications network (1), offered to the network modules by way of the Service Switching Point (2), which control member buffers the information signals recorded from the network modules, while, on the other side, the control member is connected to the Service Control Point (3) for giving off the information signals to the Service Control Point on behalf of the network modules.

2. Intelligent network according to claim 1, wherein the number of network modules includes at least one intelligent peripheral (5).

3. Intelligent network according to claim 1, wherein the number of network modules includes at least one voice response system (4).

4. Intelligent network according to claim 2, wherein the number of network modules includes at least one voice response system (4).

5. Intelligent network according to claim 1, wherein the control member (6) includes a coupling to an external database for combining telephony and data services.

6. Intelligent network according to claim 2, wherein the control member (6) includes a coupling to an external database for combining telephony and data services.

7. Intelligent network according to claim 3, wherein the control member (6) includes a coupling to an external database for combining telephony and data services.

8. Intelligent network according to claim 1, wherein the control member (6) includes a coupling to a network (7), such as the Internet.

9. Intelligent network according to claim 2, wherein the control member (6) includes a coupling to a network (7), such as the Internet.

10. Intelligent network according to claim 3, wherein the control member (6) includes a coupling to a network (7), such as the Internet.

11. Intelligent network according to claim 4, wherein the control member (6) includes a coupling to a network (7), such as the Internet.

12. Intelligent network according to claim 5, wherein the connections between the control member (6) and any of the network modules (4, 5), and the coupling to the network (7), such as the internet, have been arranged for the use of a protocol of the kind TCP/IP.

13. Intelligent network, comprising at least one Service Switching Point (SSP), at least one Service Control Point (SCP), and a number of network modules, which intelligent network is capable of interacting with a telecommunications network, each of the number of network modules being of a kind out of two kinds, the two kinds of network modules being Intelligent Peripheral (IP) and Voice Response System (VRS), and the telecommunications network being of a kind out of two kinds, the two kinds of telecommunication networks being public switched telephony network (PSTN) and integrated services digital network (ISDN), wherein a network module collects information on a call from the telecommunications network, and the network module does return the information collected to the Service Control Point where after optionally the network module returns the call to the Service Switching Point, so that a line used for the call is vacated on the network module and optionally the Service Control Point instructs the Service Switching Point to switch the call through to another destination.

* * * * *